(12) United States Patent
Shah et al.

(10) Patent No.: US 8,853,326 B1
(45) Date of Patent: Oct. 7, 2014

(54) RF WELDABLE FILM ARTICLES, AND THERMOPLASTIC ELASTOMER COMPOSITIONS AND PROCESSES

(75) Inventors: Tilak M. Shah, Cary, NC (US); Kimberly Ogburn, Cary, NC (US); Christopher D. Strom, Cary, NC (US)

(73) Assignee: Polyzen Inc., Apex, NC (US)

( * ) Notice: Subject to any disclaimer, the term of this patent is extended or adjusted under 35 U.S.C. 154(b) by 0 days.

(21) Appl. No.: 13/554,575

(22) Filed: Jul. 20, 2012

Related U.S. Application Data

(60) Provisional application No. 61/510,031, filed on Jul. 20, 2011.

(51) Int. Cl.
 *C08L 53/00* (2006.01)
 *C08L 23/00* (2006.01)
 *C08L 25/02* (2006.01)
 *C08F 8/00* (2006.01)

(52) U.S. Cl.
 USPC .................. 525/88; 525/95; 525/98; 525/191; 525/240; 525/241; 428/34.8; 428/35.2; 428/35.7

(58) Field of Classification Search
 USPC ........... 428/34.8, 34.9, 35.1, 35.2, 35.4, 35.5, 428/35.7, 36.6, 36.8, 36.9, 36.91, 36.92; 521/146–148; 525/88, 95, 98, 191, 525/240, 241
 See application file for complete search history.

(56) References Cited

U.S. PATENT DOCUMENTS

| | | | |
|---|---|---|---|
| 5,601,889 A | 2/1997 | Chundury et al. | |
| 6,162,865 A | 12/2000 | Buehring et al. | |
| 6,815,058 B2 * | 11/2004 | Watanabe et al. | 428/354 |
| 7,157,525 B2 * | 1/2007 | Cho et al. | 525/438 |
| 7,544,742 B2 | 6/2009 | Walsh | |
| 7,875,680 B2 | 1/2011 | Chen | |
| 7,895,681 B2 | 3/2011 | Ferrara | |
| 8,071,223 B2 | 12/2011 | Chen | |
| 8,167,859 B2 | 5/2012 | Shah et al. | |

FOREIGN PATENT DOCUMENTS

| | | |
|---|---|---|
| JP | 2007-126616 A | 5/2007 |
| WO | 2010128168 A2 | 11/2010 |

OTHER PUBLICATIONS

Dupont, "Entire AS 500 resin Material Safety Data Sheet Version 2.3", Aug. 12, 2011, pp. 1-7.
Dupont, "Entira AS SD100 resin Material Safety Data Sheet Version 2.2", Aug. 12, 2011, pp. 1-8.
Polyone GLS Thermoplastic Elastomers, "Genesis Plastics Welding and PolyOne Collaborate on Breakthrough in RF Welding Using Versaflex TPEs", "PolyOne GLS Thermoplastic Elastomers News Release", Oct. 4, 2010, pp. 1-4.
Polyone GLS Thermoplastic Elastomers, "PolyOne Takes the Guesswork Out of Bonding: Versaflex TPE Healthcare Grades for Medical Fluid Delivery Systems", "PolyOne GLS Thermoplastic Elastomers News Release", Feb. 8, 2011, pp. 1-3.

\* cited by examiner

*Primary Examiner* — Walter B Aughenbaugh
(74) *Attorney, Agent, or Firm* — Hultquist, PLLC; Steven J. Hultquist; Mary B. Grant

(57) ABSTRACT

An RF-weldable thermoplastic elastomer composition, including a thermoplastic elastomer of non-RF-weldable or poorly RF-weldable character, e.g., a styrenic copolymer/olefinic polymer blend thermoplastic elastomer, and polyol in an amount that is less than 1% by weight, based on weight of the thermoplastic elastomer, and is effective to enhance RF-weldability of the thermoplastic elastomer. The composition may also contain an antistatic ionomer, in an amount that is less than 15% by weight, based on weight of the thermoplastic elastomer. Films of such composition are usefully employed to form RF-welded film articles, such as blood bags, IV fluid bags, glucose bags, urine bags, stool bags, biological sample bags, pouches, covers, and liners.

21 Claims, 1 Drawing Sheet

RF WELDABLE FILM ARTICLES, AND THERMOPLASTIC ELASTOMER COMPOSITIONS AND PROCESSES

CROSS-REFERENCE TO RELATED APPLICATION

The benefit under 35 USC 119 of U.S. Provisional Patent Application No. 61/510,031 filed Jul. 20, 2011 in the names of Tilak M. Shah, et al. is hereby claimed. The disclosure of such provisional application is hereby incorporated herein by reference, in its entirety, for all purposes.

FIELD

The present disclosure relates to RF-weldable styrenic rubber/olefin thermoplastic elastomer (SROTPE) film compositions and product articles formed from such film, including, without limitation, fluid bags fabricated by RF-welding of such film.

DESCRIPTION OF THE RELATED ART

In the medical field, various fluids are delivered, stored, collected, and processed in containers, e.g., thin film bags, for medical and pharmaceutical applications. Such containers are fabricated from materials, typically non-SROTPE film materials having properties ensuring that fluids contained therein remain sterile and storage-stable.

Medical containers of the foregoing type may be used in the containment of a wide variety of fluids and biomaterials, e.g., pharmaceutical preparations, glucose, saline, and bodily fluids and wastes such as blood, urine, stools, etc. The specific characteristics of such containers will depend on their intended use. In some cases, such as bags for IV fluids, the container is desirably thick-walled, for durability in handling and use. In other cases, such as ostomy bags, the container is of lower thickness so that it can be worn against the body of a user.

Films have been developed to impart many desired characteristics to medical containers fabricated therefrom, and to film articles such as liners for medical packaging. In all such uses, the film should be strong, durable, flexible, stable, biocompatible, safe, and tear- and puncture-resistant. Other desirable film characteristics in specific applications may include transparency of the film, ability to label the film, steam-sterilizability, waterproof character, etc.

In manufacture of film articles such as medical containers, a film is generally made, then sealed in an assembly by a method that is appropriate to the film composition, to produce the final film article. Various sealing methods may be employed, such as impulse welding, thermo-contact welding and high frequency (HF) or dielectric welding. HF welding is a preferred method for welding or sealing films that contain chemical dipoles. HF welding uses high frequency electromagnetic waves to heat and soften the film for bonding. The heating is localized to a desired area so that the combination of pressure, heat and high frequency waves results in a sealed film with a strong and consistent seam. Radio frequency (RF) welding is a preferred type of high frequency (27.12 MHz) welding used in many film article applications. RF welding of polymeric films is a technique with a well-established knowledge base, and is well-suited to high manufacturing volume operations.

Polyvinyl chloride (PVC) is widely used in the manufacture of film containers such as bags for medical applications. PVC is advantageous in that it produces a durable film that is clear and flexible, and may be reused and/or recycled. PVC is well suited to RF welding. PVC films may contain only PVC, but more commonly include various additives to impart desired characteristics to the film. Conventional additives that may be employed for such purpose include, without limitation, stabilizers, colorants, plasticizers, softeners, fillers, and strengtheners.

In recent years, concerns have arisen over the use of PVC and additives in PVC bags. These concerns relate to the release of toxic chemical pollutants such as dioxin, hydrochloric acid, and vinyl chloride in the manufacture of PVC films. Further concerns have focused on potential leaching of toxic materials from the finished films, or products incorporating such films, with particular focus on di(2-ethylhexyl) phthalate (DEHP), widely used as a plasticizer in PVC films to enhance their flexibility.

As a result of these concerns, PVC product articles have been banned in Europe, and similar bans are under current consideration in a number of U.S. locations, including the State of California.

Accordingly, there is a need for alternatives to PVC films. Specifically, plastic films are needed that possess the various advantages of PVC, particularly the ability to be processed using RF welding, without the environmental and health concerns that are associated with PVC.

Potentially alternative polymeric film materials for such applications include styrenic rubber/olefin thermoplastic elastomer (SROTPE) film compositions. SROTPE films possess advantageous characteristics of both thermoplastics and elastomers, being flexible and stretchable. There are various commercialized thermoplastic elastomer groups: styrenic block copolymer/polyolefin blends (SROTPE), elastomeric alloys, thermoplastic polyurethanes (TPUs), ethylene vinyl acetate (EVA) thermoplastic copolyesters, and thermoplastic polyamides.

Most TPEs can be stretched and return to a shape that is close to the original shape. In addition, most TPEs can be processed at high temperatures and will not deform over time. Furthermore, because TPEs do not contain halogens and do not require addition of plasticizers, environmental and health concerns are lessened. TPEs are particularly preferred for their ease and speed of processing and the low costs associated with such processing. TPE materials may be processed by conventional means, such as injection molding, extrusion, blow molding, thermoforming, and heat welding.

Among TPEs, SROTPEs possess well-balanced thermal and mechanical properties that make them attractive alternatives for replacing PVC. Nonetheless, despite their advantageous properties and cost advantages, SROTPE materials are characteristically wholly unsuitable for processing by RF film welding techniques.

It would therefore be a major advance in the art to provide SROTPE film materials that can be processed by high volume manufacturing RF welding techniques, to fabricate film articles such as film bags for various medical applications.

SUMMARY

The present disclosure relates to film compositions including SROTPE materials that in their as-manufactured or otherwise provided state are non-RF-weldable or poorly RF-weldable in character, but which as a result of being formulated in film compositions of the present disclosure are rendered RF-weldable. Accordingly, the present disclosure relates to RF-weldable SROTPE film compositions and product articles formed from such film, including, without limitation, fluid bags fabricated by RF-welding of such film.

In one aspect, the disclosure relates to an RF-weldable thermoplastic elastomer composition, comprising a SROTPE and a polyol, wherein the polyol is present in an amount enhancing the RF-weldability of the composition in relation to a corresponding composition lacking such polyol, and wherein the composition optionally further comprises an antistatic ionomer.

In another aspect, the disclosure relates to a method for enhancing RF-weldable character of a non-RF-weldable or poorly RF-weldable SROTPE, comprising formulating the SROTPE with a polyol in an effective amount for imparting such character, and optionally with an antistatic ionomer.

In a further aspect, the disclosure relates to an RF-weldable polymeric film, the film comprising a SROTPE polymer, less than 1% by weight of polyol and optionally less than 15% by weight of antistatic ionomer, wherein such weight percents are based on weight of the SROTPE polymer, and wherein the polyol, and when present, the antistatic ionomer, have concentrations of at least 0.005% by weight, based on weight of the SROTPE polymer.

In another aspect, the disclosure relates to a method of manufacturing an RF-weldable film, comprising forming such film from an RF-weldable thermoplastic elastomer composition of the present disclosure.

A further aspect of the disclosure relates to a method of forming an RF-welded film article, comprising fabricating an article including a seam comprising an RF-weldable film of the present disclosure, and RF welding such seam.

A still further aspect of the disclosure relates to an article comprising an RF-welded SROTPE film of the present disclosure.

Another aspect of the disclosure relates to an RF-weldable thermoplastic elastomer composition, comprising a thermoplastic elastomer of non-RF-weldable or poorly RF-weldable character, and polyol in an amount that is less than 1% by weight, based on weight of the thermoplastic elastomer, and is effective to enhance RF-weldability of said thermoplastic elastomer.

A further aspect of the disclosure relates to an RF-weldable composition comprising a styrenic block copolymer/olefinic polymer thermoplastic elastomer, polyol in an amount of from 0.005% by weight to 0.9% by weight, based on weight of the thermoplastic elastomer, and optionally antistatic ionomer in an amount of less than 15% by weight, based on weight of the thermoplastic elastomer.

Yet another aspect of the disclosure relates to a method of enhancing RF-weldable character of a non-RF-weldable or poorly RF-weldable styrenic block copolymer/olefinic polymer thermoplastic elastomer (SROTPE), comprising formulating the SROTPE with a polyol in an effective amount that is less than 1% by weight, based on weight of the SROTPE, for imparting such character, and optionally with an antistatic ionomer.

Other aspects, features and embodiments of the disclosure will be more fully apparent from the ensuing description and appended claims.

DETAILED DESCRIPTION

Figure 1:
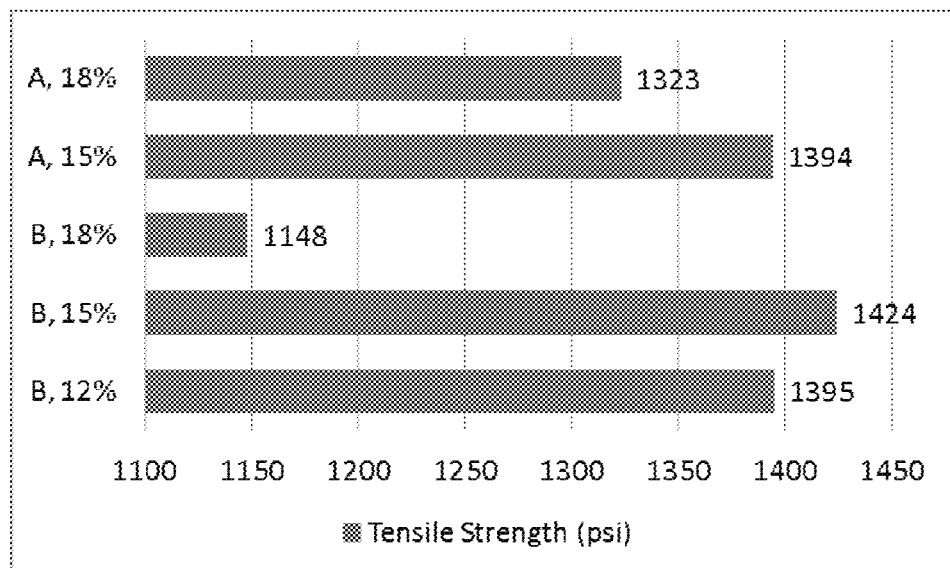
FIG. 1 is a bar graph of tensile strength, in psi, for thermoplastic elastomer films in which antistatic ionomer is present in differing concentrations.

The present disclosure relates to SROTPE polymers that in their as-manufactured or otherwise provided state are non-RF weldable or poorly RF-weldable in character, and to compositions, methods, films, and articles utilizing SROTPEs, wherein RF-weldability has been imparted to the SROTPE, as hereinafter more fully disclosed.

In various aspects, the disclosure relates to an RF-weldable thermoplastic elastomer composition, comprising a SROTPE and a polyol, wherein the polyol is present in an amount enhancing the RF-weldability of the composition in relation to a corresponding composition lacking such polyol, and wherein the composition optionally further comprises an antistatic ionomer.

Compositions of the disclosure can be formulated as comprising a SROTPE polymer, less than 1% by weight of polyol and optionally less than 15% by weight of antistatic ionomer, wherein such weight percents are based on weight of the SROTPE polymer, and wherein the polyol, and when present, the antistatic ionomer, have concentrations of at least 0.005% by weight, based on weight of the SROTPE polymer.

The disclosure correspondingly contemplates a method for enhancing RF-weldable character of a non-RF-weldable or poorly RF-weldable SROTPE, including formulating the SROTPE with a polyol in an effective amount for imparting such character, and optionally with an antistatic ionomer, to form a corresponding SROTPE composition of the disclosure.

Such compositions can be used to form RF-weldable SROTPE polymeric film, by conventional film formation techniques such as melt extrusion, blow extrusion, film casting, etc.

The RF-weldable SROTPE polymeric film can in turn be employed to produce RF-welded film articles, such as by fabricating an article including a seam comprising an RF-weldable SROTPE film of the present disclosure, and RF welding such seam. Such RF-welded articles can be of any suitable type, and may for example include bag articles, sheathing and packaging articles, protective barrier structures such as surgical shrouds and curtain articles, and any other products in which RF-welded TPE films can be employed.

The SROTPE compositions of the present disclosure include polyol at low concentrations of at least 0.005% but below 1% by weight, based on weight of the SROTPE, to enhance the RF-weldability of the SROTPE in relation to corresponding SROTPE compositions lacking the polyol. The amount of the polyol may for example be in a range of from 0.005% by weight to 0.95% by weight, based on weight of the SROTPE polymer in the composition, in some embodiments of the disclosure. In other embodiments, the amount of polyol may be from 0.02% to 0.85% by weight, from 0.01% to 0.8% by weight, or from 0.25% to 0.8% by weight, or in ranges having a lower limit of 0.03%, 0.04%, 0.05%, 0.06%, or 0.07%, and an upper limit of greater magnitude than the lower limit, which in various combinations with lower limits of the foregoing numerical values may be 0.05%, 0.08%, 0.09%, 0.1%, 0.2%, 0.3%, 0.4%, 0.5%, 0.6%, 0.7%, 0.8%, or 0.9%, as may be appropriate in specific embodiments with specific SROTPE materials to provide compositions of enhanced SROTPE RF-weldability. All preceding percentages of polyol are percentages by weight, based on weight of the SROTPE polymer in the composition. It has been found that at polyol concentrations below 0.005% inadequate polyol is present to significantly improve RF-weldability of the SROTPE polymer, and that at polyol concentrations of 1% and above, the RF-weldability enhancement of the SROTPE polymer becomes increasingly diminished.

The polyol component of the SROTPE compositions of the present disclosure can be of any suitable type that is effective to impart improved RF-weldability to the SROTPE polymer.

The polyol may comprise a diol, triol, or other polyol functionality. Suitable polyols include polyhydroxy compounds such as polyhydroxy alcohols, glycols, sugar alcohols, glycerols, alkane diols, monosaccharides, polysaccharides, etc. Preferred polyols include glycerol (glycerin), ethylene glycol and propylene glycol, with glycerol being most highly preferred.

The RF-weldable SROTPE compositions of the present disclosure, in addition to the polyol component, may in various embodiments also incorporate antistatic ionomer.

In general, the amount of antistatic ionomer utilized in SROTPE compositions of the present disclosure is less than 15% by weight, based on weight of the SROTPE polymer. The antistatic ionomer can for example be present at a concentration of from 3% to less than 15% by weight, based on weight of the SROTPE polymer. In various embodiments, the amount of the antistatic ionomer in the SROTPE composition does not exceed 10% by weight, based on based on weight of the SROTPE polymer, and in other embodiments, the amount of the antistatic ionomer is less than 10% by weight, based on weight of the SROTPE polymer. Still other embodiments may utilize the antistatic ionomer in an amount that is in a range of from 3% to 10% by weight, or of from 5% to 10% by weight, or of from 6% to 8% by weight, or in ranges in which the lower limit may be any one of 1%, 2%, 3%, 4%, 5%, or 6%, and in which the upper limit is greater than the lower limit, and may be any one of 4%, 5%, 6%, 7%, 8%, 9%, 10%, 12%, 13%, or 14%, in all appropriate combinations for applications of the SROTPE polymer compositions of the disclosure. All of the preceding weight percentages of the antistatic ionomer are based on weight of the SROTPE polymer.

More generally, it will be appreciated that the amount of ionomeric antistatic agent to be used will be an amount that improves the RF weldability of the SROTPE- and polyol-containing composition, in relation to a corresponding SROTPE- and polyol-containing composition lacking the antistatic ionomer. Amounts of antistatic ionomer below 3% by weight are less preferred as requiring higher RF welding energy, and amounts of antistatic ionomer of 15% by weight and higher are susceptible to sparking and thus require a dry inert atmosphere that increases the cost and complexity of the RF welding operation. The previously discussed ranges of antistatic ionomer concentration therefore represent a balance of the considerations of film properties and weldable character of the film compositions.

The present disclosure therefore represents a departure from antistatic packaging approaches that have been employed to produce film packaging material and articles for static electricity-sensitive products such as microelectronic chips and devices, in which substantially higher amounts of ionomeric antistatic components, typically greater than 15% by weight, based on weight of the polymer in the composition, have been employed to ensure that sensitive microelectronic components packaged in such film material are not damaged by static discharge events.

RF-weldable compositions of the present disclosure, by contrast, can utilize substantially lower amounts of ionomeric antistatic agents, in combination with very low levels of polyol, to substantially improve RF-weldability of otherwise difficult- or impossible-to-RF weld thermoplastic elastomers.

In this respect, the use of reduced levels of antistatic ionomer, in relation to antistatic film compositions previously used for packaging of microelectronic components, affords a further and significant advantage of significantly increasing tensile strength of the thermoplastic elastomer film material, in relation to corresponding film material with higher levels of antistatic ionomer. This is shown in the graph of FIG. 1, in which tensile strength data is set forth for various thermoplastic elastomer film compositions (A=ethylene copolymer containing antistatic ionomer at concentration of 15 wt % in a first sample, and 18 wt % in a second sample; B=ethylene methacrylic acid copolymer containing antistatic ionomer at concentration of 12 wt % in a first sample, 15 wt % in a second sample, and 18 wt % in a third sample). All of the tested samples contained <10 wt % polyol. All weight percents were based on weight of the corresponding copolymer.

The data in FIG. 1 show that tensile strength of the polymeric film decreases with increasing ionomeric antistatic agent concentration above 15%, and that TPE film compositions in which antistatic agent concentrations are 15% and below exhibit higher tensile strength (>1300 psi (8963 kPa)).

The SROTPE/polyol compositions of the present disclosure therefore achieve surprising enhancement of RF-weldability of resultant SROTPE films, and such compositions can incorporate antistatic ionomer without loss of tensile strength of the SROTPE film.

While directed primarily herein to styrenic rubber/olefin thermoplastic elastomer alloy blend materials, the approach of the present disclosure in the use of polyol and optional antistatic ionomer is also applicable to other thermoplastic elastomer materials that are inherently difficult or impossible to RF weld, including, without limitation, polymers such as polyethylenes, polypropylenes, polystyrene, and copolymers including repeating units derived from monomers such as ethylene, propylene, vinyl acetate, acrylic monomers, methacrylic monomers, and vinyl alcohol. The polyolefin olefinic component(s) in the SROTPE polymers used in the compositions of the present disclosure can be of any suitable type, and the polyolefin may for example derive from ethylenically unsaturated olefins such as ethylene, propylene, butylene, etc. TPE materials useful in the broad practice of the present disclosure can be of any suitable type, and include, by way of example, GLS® products such as the Versaflex® line of TPE alloys or the TPEs commercially available from Teknor Apex®.

The SROTPE film compositions of the present disclosure can be utilized in any applications in which RF weldability is necessary or desirable in the manufacture of product articles. Product articles in turn may be of any suitable type, and may in specific embodiments include, without limitation, blood bags, saline bags, pharmaceutical manufacturing transfer bags, bio-waste bags, and the like.

Particularly preferred RF-weldable SROTPE compositions of the disclosure include styrenic block copolymer rubber blended with olefinic polymer such as polypropylene or polyethylene, as the SROTPE polymer, and glycerol as the polyol. Other preferred compositions include styrenic block copolymers with olefinic polymers such as polypropylene or polyethylene, e.g., styrene-polypropylene blend, together with polyol such as glycerol or other polyhydroxy material, and optionally antistatic ionomer.

In the processing of inherently non-RF-weldable or poorly RF-weldable SROTPE materials to impart RF-weldability thereto, in accordance with the present disclosure, the SROTPE material may be compounded or formulated as a resin, melt, or otherwise in a solid form, to which is added polyol and optionally antistatic ionomer. The respective TPE, polyol, and optional ionomer components may be blended mechanically with one another, or otherwise aggregated to produce a formulation, as suitable for melt extrusion into film or tubing material containing such components.

Such film and tubing material are particularly useful for various applications in the medical and pharmaceutical fields, such as manufacture of blood bags, IV fluid bags, glucose bags, urine bags, stool bags, biological materials bags, and as liners for drug preparation vessels and the like. Film articles of the present disclosure may comprise bags, pouches, covers or liners of widely varied types. The film articles can comprise single or multiple RF-welded seams.

In various embodiments, the SROTPE material is present in the RF-weldable film at any suitable concentrations, e.g., a concentration of from about 85% by weight to about 90% by weight or more, e.g., up to 99 wt. %, based on total weight of the film. In other embodiments, the SROTPE material may be present in the film at a concentration of from 90% to 95% by weight, based on total weight of the film, and in still other embodiments, the SROTPE material may be present in the film at a concentration of from 95% to 99% by weight or higher, based on total weight of the film.

SROTPE films of the disclosure may be of any suitable thickness. In some embodiments, the SROTPE film may have a thickness in a range of from about 5 mil to about 20 mils (0.0127 mm to 0.508 mm), although greater or lesser thicknesses may be employed in other embodiments of the disclosure. For example, in other embodiments, the TPE film may have a thickness in a range of from about 2.0 mils to about 50.0 mils (0.0508 mm to 1.27 mm).

The SROTPE films of the disclosure may include antistatic ionomer at any suitable concentration that does not preclude the RF-weldability of the film. Any suitable antistatic ionomer can be used for such purpose, provided that the resulting film is appropriately RF-weldable in character. An illustrative antistatic ionomer comprises Entira AS SD100 antistatic ionomer, commercially available from DuPont de Nemours & Company, Inc. (Wilmington, Del.).

The disclosure thus contemplates a polymeric film weldable by radio frequency welding, where the film contains a thermoplastic elastomer, <1% by weight of a polyol, and <15% by weight of antistatic ionomer, wherein all weights of the components of the film are based on the weight of the thermoplastic elastomer in the film. In various embodiments, the thermoplastic elastomer concentration in the film is >84% by weight, based on total weight of the film.

In other specific embodiments, the RF-weldable film comprises GLS® TPE Versaflex CLE 85 as the TPE component, less than 1% by weight of glycerol, and from 3% up to but less than 15% by weight of DuPont® Entira AS SD100 as the antistatic ionomer component, based on weight of the TPE.

The RF-weldable TPE films of the disclosure are strong, durable, flexible, and compatible with physiological fluids, and medical and biological materials generally.

TPE films of the present disclosure can be bonded to other films, tubing or film article components by RF welding techniques or otherwise sealed in any known manner. Seam structures comprising film(s) of the present disclosure can be welded under compression in die welding apparatus under welding conditions effective to obtain the desired extent of bonding, e.g., continuous seam bonding. Welding of film(s) of the present disclosure is advantageously carried out by radio frequency bonding, in which the film material is heated by radio frequency waves, to achieve a sealed polymeric film, at a fast rate with highly localized heating. Sealed plastic films produced by RF welding will cool rapidly, and can be removed from the manufacturing apparatus quickly, thereby enabling production time to be sufficiently short to accommodate high volume manufacturing.

As indicated in the Background section hereof, many commercially available TPE films, despite their otherwise advantageous properties, are not RF-weldable. The polyol-containing film compositions of the present disclosure overcome such deficiency and are readily weldable by RF welding techniques to enable manufacturing of TPE film articles that otherwise cannot be manufactured using RF welding.

The TPE film compositions of the present disclosure can be used in existing RF polymeric film welding production facilities, and do not require modification of existing production equipment or production facilities otherwise utilized for RF-welding of PVC or other polymer films.

Film articles of the present disclosure can be fabricated in any suitable manner. Assembly of the film prior to RF-welding can be performed in any manner appropriate to fabrication of the desired film article. The assembly may include a single sheet of film or may include more than one sheet of film. In one embodiment a single film is folded back on itself to provide an edge region comprising the seam. The edge region may be the folded edge of the film or the edge region may be aligned portions of the same sheet. In other embodiments, one or more sheets of film are superimposed in registration with one another, to form at least one registered edge region comprising the seam that then is RF-welded.

The RF-welding of the article may comprise RF-welding to form additional seams parallel to or perpendicular to an initial weld line, in the production of the desired article. Where the film article contains more than one sheet or layer of film in a seam structure, all such sheets and layers are appropriately RF-weldable.

In various embodiments, in which the film article comprises a bag for medical or pharmaceutical use, the bag may comprise sealed edges forming a containment structure for a biological fluid, packaged device, medicament, irrigation fluid, therapeutically effective material, or other substance or article that can be internally contained in the bag article.

In a specific embodiment, the bag comprising RF-welded panels of film of the present disclosure is constructed and adapted to contain blood, blood component, or plasma. In other embodiments, the bag contains isotonic saline solution for intravenous administration. In still other embodiments, the bag contains heparin, epinephrine, tissue plasminogen activator, or other emergency medical treatment therapeutic material.

Figure 2:
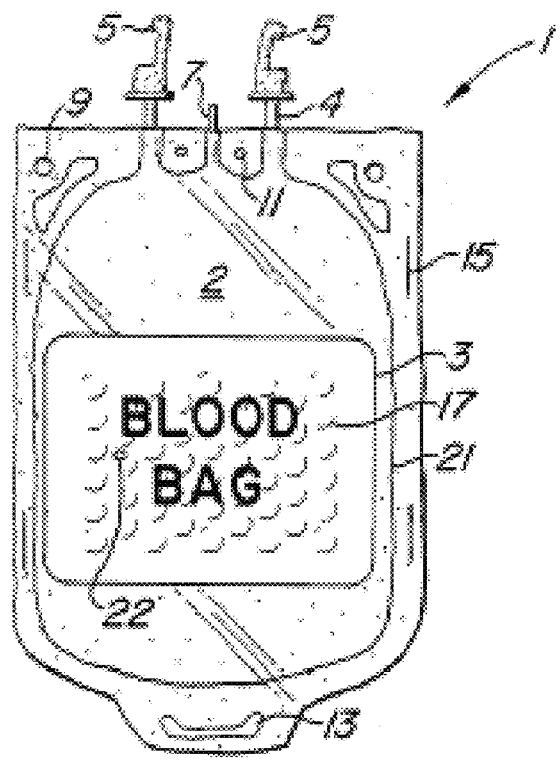
FIG. 2 is a front elevation view of a blood bag of an illustrative type incorporating RF-weldable film panels in accordance with one embodiment of the present disclosure.

FIG. 2 is a front elevation view of a blood bag 1 of an illustrative type incorporating RF-welded film panels 2 in accordance with the present disclosure. The blood bag may include front and back sheets of SROTPE/polyol composition film, of suitable thickness, e.g., 12-15 mils thickness, that have been RF welded along seam 21 to form an enclosed volume of the bag for introduction of blood or a blood fraction, e.g., platelets, into the interior volume of the bag. The bag includes access ports 4 and 7, and removable port protectors 5, as well as openings 9 and 11 for mounting or otherwise positioning the bag in use. Longitudinal slits 15 may be provided for holding blood sample tubes, and an anterior flanged portion of the bag may include a slit 13 for hanging of the bag on an arm of an intravenous fluids administration assembly.

The bag may include a label 3 secured to the front panel with a textured surface of indentations 17 to facilitate retention of printed indicia on the label, and an RFID chip 22 may be incorporated in the label, or otherwise on the bag, to facilitate inventory control, tracking, patient data logging, and the like.

While the disclosure has been has been set out herein in reference to specific aspects, features and illustrative embodiments, it will be appreciated that the utility of the disclosure is not thus limited, but rather extends to and encompasses numerous other variations, modifications and alternative embodiments, as will suggest themselves to those of ordinary skill in the field of the present disclosure, based on the description herein. Correspondingly, the invention as hereinafter claimed is intended to be broadly construed and interpreted, as including all such variations, modifications and alternative embodiments, within its spirit and scope.

What is claimed is:

1. An RF-weldable thermoplastic elastomer composition, comprising a thermoplastic elastomer comprising a styrenic block copolymer/olefinic polymer thermoplastic elastomer (SROTPE), and polyol in an amount that is less than 1% by weight, based on weight of the thermoplastic elastomer, and is effective to enhance RF-weldability of said thermoplastic elastomer.

2. The composition of claim 1, wherein the SROTPE comprises polypropylene as the olefinic polymer.

3. The composition of claim 1, wherein the SROTPE comprises polyethylene as the olefinic polymer.

4. The composition of claim 1, wherein the polyol comprises glycerol.

5. The composition of claim 4, wherein the concentration of glycerol in said composition is in a range of from 0.005% by weight to 0.95% by weight, based on weight of the thermoplastic elastomer.

6. The composition of claim 4, wherein the concentration of glycerol in said composition is in a range of from 0.01% by weight to 0.8% by weight, based on weight of the thermoplastic elastomer.

7. The composition of claim 1, further comprising antistatic ionomer.

8. The composition of claim 7, wherein the concentration of antistatic ionomer is less than 15% by weight, based on weight of the thermoplastic elastomer.

9. The composition of claim 7, wherein the concentration of ionomer is less than 10% by weight, based on weight of the thermoplastic elastomer.

10. An RF-weldable thermoplastic elastomer film, comprising a composition according to claim 1.

11. The RF-weldable thermoplastic elastomer film of claim 10, wherein the composition comprises a SROTPE thermoplastic elastomer, less than 1% by weight of polyol and optionally less than 15% by weight of antistatic ionomer, wherein such weight percents are based on weight of the SROTPE thermoplastic elastomer.

12. An RF-welded article comprising an RF-weldable film of the RF-weldable thermoplastic elastomer composition of claim 1.

13. The RF-welded article of claim 12, comprising an article selected from the group consisting of blood bags, IV fluid bags, glucose bags, urine bags, stool bags, biological sample bags, pouches, covers, and liners.

14. An RF-weldable composition comprising a styrenic block copolymer/olefinic polymer thermoplastic elastomer, polyol in an amount of from 0.005% by weight to 0.9% by weight, based on weight of the thermoplastic elastomer, and optionally antistatic ionomer in an amount of less than 15% by weight, based on weight of the thermoplastic elastomer.

15. The RF-weldable composition of claim 14, wherein the styrenic block copolymer/olefinic polymer thermoplastic elastomer is formulated with antistatic ionomer in an amount that is in a range of from 3% by weight to less than 15% by weight, based on weight of the styrenic block copolymer/olefinic polymer thermoplastic elastomer.

16. A method of enhancing RF-weldable character of a styrenic block copolymer/olefinic polymer thermoplastic elastomer (SROTPE), comprising formulating the SROTPE with a polyol in an effective amount that is less than 1% by weight, based on weight of the SROTPE, for imparting such character, and optionally with an antistatic ionomer.

17. The method of claim 16, wherein the polyol comprises glycerol in an amount of from 0.005% by weight to 0.95% by weight, based on weight of the SROTPE.

18. The method of claim 16, wherein the SROTPE is formulated with antistatic ionomer in an amount that is in a range of from 3% by weight to less than 15% by weight, based on weight of the SROTPE.

19. A method of manufacturing an RF-weldable film, comprising forming such film from an RF-weldable thermoplastic elastomer composition of claim 1.

20. A method of forming an RF-welded film article, comprising fabricating an article including a seam comprising an RF-weldable film of the RF-weldable thermoplastic elastomer composition of claim 1, and RF-welding such seam.

21. The method of claim 20, wherein the composition comprises a SROTPE thermoplastic elastomer, less than 1% by weight of polyol and optionally less than 15% by weight of antistatic ionomer, wherein such weight percents are based on weight of the SROTPE thermoplastic elastomer.

* * * * *